US012795804B2

(12) United States Patent
Nishino

(10) Patent No.: US 12,795,804 B2
(45) Date of Patent: Nov. 10, 2026

(54) X-RAY GENERATOR

(71) Applicant: HAMAMATSU PHOTONICS K.K., Hamamatsu (JP)

(72) Inventor: Daiki Nishino, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 155 days.

(21) Appl. No.: 18/818,890

(22) Filed: Aug. 29, 2024

(65) Prior Publication Data

US 2025/0113426 A1 Apr. 3, 2025

(30) Foreign Application Priority Data

Oct. 3, 2023 (JP) ................................ 2023-172256

(51) Int. Cl.
*H05G 1/10* (2006.01)

(52) U.S. Cl.
CPC .................................... *H05G 1/10* (2013.01)

(58) Field of Classification Search
CPC ....................................................... H05G 1/10
See application file for complete search history.

(56) References Cited

U.S. PATENT DOCUMENTS

| | | | | |
|---|---|---|---|---|
| 2009/0060140 A1* | 3/2009 | Subraya | ................... | H05G 1/52 378/125 |
| 2011/0241533 A1* | 10/2011 | Ochi | ..................... | H01J 1/3046 313/310 |
| 2016/0336140 A1* | 11/2016 | Nonoguchi | ........... | H01J 35/025 |
| 2024/0062985 A1* | 2/2024 | Radcliffe | .............. | H01J 35/147 |
| 2024/0170248 A1* | 5/2024 | Podhola | ................ | H01J 29/563 |

FOREIGN PATENT DOCUMENTS

| | | |
|---|---|---|
| JP | H08-94546 A | 4/1996 |
| JP | 2014-130732 A | 7/2014 |

* cited by examiner

*Primary Examiner* — Hugh Maupin
(74) *Attorney, Agent, or Firm* — Faegre Drinker Biddle & Reath LLP

(57) ABSTRACT

An X-ray generator includes: a cathode electrode configured to emit electrons; an adjustment electrode configured to adjust an amount of electrons emitted from the cathode electrode; a control electrode configured to control a trajectory of the electrons from the cathode electrode; a target configured to generate an X-ray by incidence of the electrons; a discharge detection unit configured to detect discharge between the cathode electrode and the adjustment electrode; and a voltage switching unit configured to switch a voltage difference between the cathode electrode and the control electrode such that a focal dimension of the electrons on the target during discharge detection is larger than the focal dimension of the electrons on the target during normal operation.

6 Claims, 3 Drawing Sheets

X-RAY GENERATOR

TECHNICAL FIELD

The present disclosure relates to an X-ray generator.

BACKGROUND

As a conventional X-ray generator, for example, there is a radiation generation unit described in Japanese Unexamined Patent Publication No. 2014-130732. This conventional radiation generation unit includes a cathode electrode heated by a heater, an extraction electrode that extracts electrons from the heated cathode electrode, a heater power supply connected to the heater, an electrode power supply connected to the extraction electrode, and a target that receives electrons from the cathode electrode and generates radiation.

In the X-ray generator as described above, discharge generated by various factors is a problem. For example, the X-ray generator described in Japanese Unexamined Patent Publication No. H8-94546 focuses on the discharge generated in a casing. When the discharge occurs in the casing, a voltage (tube voltage) applied between the cathode electrode and the target instantaneously decreases. At this time, when a bias voltage applied from Wehnelt is kept at a constant value, a focal area of X-ray formed on the target is excessively reduced, and the target is damaged. The X-ray generator of Japanese Unexamined Patent Publication No. H8-94546 includes means for detecting discharge generated in the casing, and controls the bias voltage applied from the Wehnelt so that a focal point of the X-ray is not smaller than an allowable limit when the discharge is detected.

SUMMARY

The discharge in the X-ray tube can also occur at a further specific location in the casing. For example, when an adjustment electrode for adjusting an amount of electrons emitted from the cathode electrode is disposed in the X-ray tube, for example, it is conceivable that a part of a material constituting the cathode electrode flies from the cathode electrode heated by the heater and adheres to the adjustment electrode. When a deposit is deposited on the adjustment electrode, a distance between the cathode electrode and the adjustment electrode is shortened, and inherent withstand voltage characteristics are deteriorated, and discharge is likely to occur. When the discharge occurs between the cathode electrode and the adjustment electrode, since the cathode electrode and the adjustment electrode have the same potential during the discharge, control of the amount of electrons emitted from the cathode electrode, which has been performed by a potential difference between the cathode electrode and the adjustment electrode, cannot be temporarily performed. In this case, since the electrons from the cathode electrode are emitted without control according to a potential difference between the cathode electrode and the target, excessive electron emission may occur from the cathode electrode. When excessive electron emission is performed from the cathode electrode, excessive electrons are incident on the target, and the target may be damaged.

The present disclosure has been made to solve the above problems, and an object of the present disclosure is to provide an X-ray generator capable of avoiding damage to the target even when the discharge occurs between the cathode electrode and the adjustment electrode.

An X-ray generator according to one aspect of the present disclosure includes: a cathode electrode configured to emit electrons; an adjustment electrode configured to adjust an amount of electrons emitted from the cathode electrode; a control electrode configured to control a trajectory of the electrons from the cathode electrode; a target configured to generate an X-ray by incidence of the electrons; a discharge detection unit configured to detect discharge between the cathode electrode and the adjustment electrode; and a voltage switching unit configured to switch a voltage difference between the cathode electrode and the control electrode such that a focal dimension of the electrons on the target during discharge detection is larger than the focal dimension of the electrons on the target during normal operation.

In the X-ray generator, when the discharge between the cathode electrode and the adjustment electrode is detected, the focal dimension of the electrons on the target is made larger than that of the electrons on the target during the normal operation by switching the voltage difference between the cathode electrode and the control electrode. Thus, even when excessive electron emission occurs from the cathode electrode due to the discharge between the cathode electrode and the adjustment electrode, it is possible to suppress excessive concentration of the electrons on the target and avoid the damage to the target.

The voltage switching unit may make the voltage difference between the cathode electrode and the control electrode during the discharge detection smaller than that during the normal operation. Thus, the focal dimension of the electrons on the target during the discharge detection can be more reliably made larger than that of the electrons on the target during the normal operation.

The voltage switching unit may include a resistor electrically connected to the cathode electrode. In this case, when electrons at a level at which the target is damaged are emitted from the cathode electrode by the discharge between the cathode electrode and the adjustment electrode, a current larger than that during the normal operation flows from the cathode electrode to the resistor. Thus, a voltage of the cathode electrode drops, and the focal dimension of the electrons on the target is larger than that of the electrons on the target during the normal operation. With this configuration, a control unit or the like that controls the voltage switching unit is unnecessary, and the damage to the target can be avoided with a simple configuration.

The voltage switching unit may include a variable power supply for applying a voltage to the cathode electrode. In this case, when the discharge between the cathode electrode and the adjustment electrode is detected, the focal dimension of the electrons on the target can be made larger than that of the electrons on the target during the normal operation by varying the voltage of the cathode electrode by the variable power supply. With this configuration, the focal dimension of the electrons can be freely adjusted by controlling a variation amount of the voltage of the cathode electrode, and the damage to the target can be more reliably avoided.

DETAILED DESCRIPTION

Hereinafter, a preferred embodiment of an X-ray generator according to one aspect of the present disclosure will be described in detail with reference to the drawings.

Figure 1:
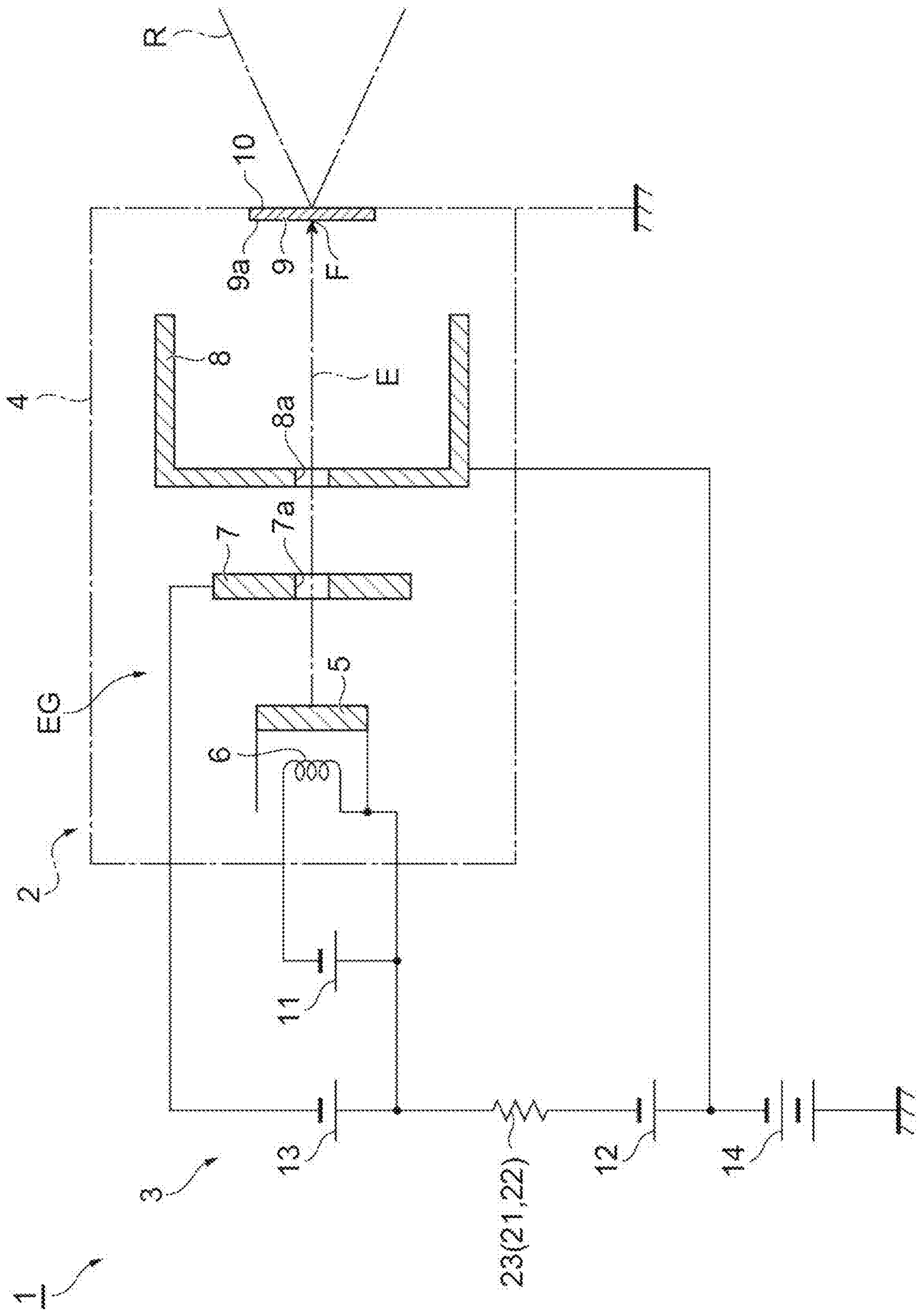
FIG. 1 is a schematic view illustrating a configuration of an X-ray generator according to an embodiment of the present disclosure.

FIG. 1 is a schematic view illustrating a configuration of the X-ray generator according to an embodiment of the present disclosure. As illustrated in the figure, an X-ray generator 1 includes an X-ray tube 2 and a drive circuit 3. The X-ray tube 2 is a transmission type X-ray tube, and is configured to include a cathode electrode 5, a heater 6, an adjustment electrode 7, a control electrode 8, and a target 9 in a vacuum housing 4. The cathode electrode 5, the heater 6, the adjustment electrode 7, and the control electrode 8 constitute an electron gun EG.

The vacuum housing 4 is formed in a hollow tubular shape by, for example, airtightly joining a head portion formed of a metal material and a valve portion formed of an insulating material. Examples of the metal material constituting the head portion include stainless steel, a nickel alloy, copper, a copper alloy, and an iron alloy. Examples of the insulating material constituting the valve portion include glass and ceramic. A window member 10 is provided at a tip end of the head portion. The window member 10 is formed in a plate shape with a tube axis as a center line using, for example, an X-ray transmissive material such as beryllium, aluminum, or diamond.

The cathode electrode 5 is an electrode that emits electrons E. The cathode electrode 5 emits electrons E by being heated by the heater 6 in an energized state. The heater 6 is a part that heats the cathode electrode 5. The heater 6 includes a filament that generates heat by energization. The electrons E emitted from the cathode electrode 5 pass through an electron passing hole 7*a* of the adjustment electrode 7 and an electron passing hole 8*a* of the control electrode 8, and travel toward the target 9.

The adjustment electrode 7 is a first grid electrode that adjusts an amount of electrons emitted from the cathode electrode 5. The amount of electrons emitted from the cathode electrode 5 refers to an amount of electrons E that pass through the adjustment electrode 7 and travel to the target 9 among the electrons E emitted from the cathode electrode 5 by heating of the heater 6. The adjustment electrode 7 controls the amount of electrons emitted from the cathode electrode 5 based on a voltage applied to the adjustment electrode 7. The adjustment electrode 7 has, for example, the electron passing hole 7*a* having a circular section. The electron passing hole 7*a* allows the electrons E emitted from the cathode electrode 5 to pass to the control electrode 8 side.

The control electrode 8 is a second grid electrode that controls a trajectory of the electrons E from the cathode electrode 5 by forming an electrostatic lens. The control electrode 8 also functions as an extraction electrode that forms an electric field for extracting electrons from the cathode electrode 5. The control electrode 8 focuses the electrons E emitted from the cathode electrode 5 and passing through the adjustment electrode 7, and focuses the electrons E as an electron beam on the target 9. The control electrode 8 has, for example, the electron passing hole 8*a* having a circular section. The electron passing hole 8*a* is disposed coaxially with the electron passing hole 7*a* of the adjustment electrode 7, and allows the electrons E passing through the electron passing hole 7*a* to pass to the target 9 side.

The target 9 is a part that generates an X-ray R by incidence of the electrons E. The target 9 is provided on an inner (a vacuum side) surface of the window member 10 on the tube axis of the vacuum housing 4. The target 9 is, for example, a film body formed on the inner surface of the window member 10. Examples of a constituent material of the target 9 include tungsten, molybdenum, and copper. The target 9 is electrically connected to a head of the vacuum housing 4. A potential of the target 9 is, for example, a ground potential.

As illustrated in FIG. 1, the drive circuit 3 is configured to include a heater power supply 11, a cathode electrode power supply 12, an adjustment electrode power supply 13, and a control electrode power supply 14. The heater power supply 11 is electrically connected to the heater 6 and supplies a voltage to the heater 6. The cathode electrode power supply 12 is electrically connected to the cathode electrode 5 and supplies the voltage to the cathode electrode 5. The adjustment electrode power supply 13 is electrically connected to the adjustment electrode 7 and supplies the voltage to the adjustment electrode 7. The control electrode power supply 14 is electrically connected to the control electrode 8 and supplies the voltage to the control electrode 8.

In the X-ray generator 1 having the above configuration, during normal operation in which the X-ray R is output from the target 9, for example, a negative high voltage of about −100 kV is applied to the electron gun EG, for example, with the potential of the target 9 as a reference (ground potential). The X-ray tube 2 of the present embodiment is a so-called triode X-ray tube having, in addition to the cathode electrode 5 and the target 9 described above, electrodes such as the adjustment electrode 7 and control electrode 8 that control the electrons E emitted from the cathode electrode 5 and directed toward the target 9, and these electrodes 5, 7, and 8 control parameters of the electrons E emitted from the cathode electrode 5 and the X-ray R generated from the target 9.

In the X-ray generator 1, the electrons E are emitted from the cathode electrode 5 by application of heat from the heater 6. The amount of electrons emitted from the cathode electrode 5 is controlled by a potential difference between the cathode electrode 5 and the adjustment electrode 7. An initial velocity of the electrons E is controlled by a potential difference between the cathode electrode 5 and the control electrode 8. The electrons E that have reached the control electrode 8 are accelerated by a potential difference between the control electrode 8 and the target 9 (here, the ground potential), and collide with the target 9.

The electrostatic lens that controls the trajectory of the electrons E is formed by a potential of the control electrode 8. A dimension of a focal point F (A focal dimension) of the electrons E on the target 9 is controlled by the initial velocity of the electrons E and an action of the electrostatic lens. The focal dimension of the electrons E on the target 9 refers to a size of an incident region of the electrons E on an electron incident surface 9*a* of the target 9. During the normal operation, the potential difference between the cathode electrode 5 and the control electrode 8 is controlled to minimize the focal dimension of the electrons E on the target 9. The X-ray R generated on the target 9 by collision of the electrons E is emitted to an outside of the X-ray tube 2 through the window member 10. Luminance (A tube current value) of the X-ray R is controlled by a potential of the adjustment electrode 7. Energy (An acceleration voltage value) of the X-ray R is controlled by the potential of the control electrode 8.

In the X-ray generator 1 described above, discharge can occur inside the X-ray tube 2. In the X-ray generator 1 in which the adjustment electrode 7 for adjusting the amount of electrons emitted from the cathode electrode 5 is disposed in the X-ray tube 2, for example, it is conceivable that a part of a material constituting the cathode electrode 5 flies from the cathode electrode 5 heated by the heater 6 and adheres to the adjustment electrode 7. Further, not limited to the material constituting the cathode electrode 5, various foreign matters such as a material constituting the heater 6 may adhere to the adjustment electrode 7. When a deposit is deposited on the adjustment electrode 7, a distance between the cathode electrode 5 and the adjustment electrode 7 is shortened, and inherent withstand voltage characteristics are deteriorated, and the discharge is likely to occur. When the discharge occurs between the cathode electrode 5 and the adjustment electrode 7, since the cathode electrode 5 and the adjustment electrode 7 have the same potential during the discharge, control of the amount of electrons emitted from the cathode electrode 5, which has been performed by the potential difference between the cathode electrode 5 and the adjustment electrode 7, cannot be temporarily performed. In this case, since the electrons from the cathode electrode 5 are emitted without control according to a potential difference between the cathode electrode 5 and the target 9, excessive electron emission may occur from the cathode electrode 5. When excessive electron emission is performed from the cathode electrode 5, excessive electrons E are incident on the target 9, and the target 9 may be damaged.

Therefore, in the X-ray generator 1, the drive circuit 3 is provided with a discharge detection unit 21 that detects discharge between the cathode electrode 5 and the adjustment electrode 7, and a voltage switching unit 22 that switches a voltage difference between the cathode electrode 5 and the control electrode 8 so that the focal dimension of the electrons E on the target 9 during discharge detection is larger than that of the electrons E on the target 9 during the normal operation. In the present embodiment, as illustrated in FIG. 1, in the drive circuit 3, a resistor 23 is connected between the cathode electrode 5 and the cathode electrode power supply 12 (on a negative electrode terminal side of the cathode electrode power supply 12), and this resistor 23 functions as the discharge detection unit 21 and the voltage switching unit 22.

When the discharge occurs between the cathode electrode 5 and the adjustment electrode 7, a current based on the discharge (a current during discharge) flows from the cathode electrode 5 to the resistor 23. The discharge current can be about 10 times as large as a current based on the normal operation (a current during normal operation). Since the current during discharge flows through the resistor 23, the voltage of the cathode electrode 5 drops greatly as compared with that during the normal operation. Due to drop of the voltage of the cathode electrode 5, it can be detected that the discharge occurs between the cathode electrode 5 and the adjustment electrode 7.

Note that a connection position of the resistor 23 may be any position at which the current during discharge flows from the cathode electrode 5, and is not limited to an example of FIG. 1. In the example of FIG. 1, the resistor 23 is connected between the cathode electrode 5 and the cathode electrode power supply 12 (on a positive electrode terminal side of the cathode electrode power supply 12), but the resistor 23 may be connected between the cathode electrode power supply 12 and the control electrode power supply 14 (on the negative electrode terminal side of the cathode electrode power supply 12). The connection position of the resistor 23 may be between the control electrode power supply 14 and a reference potential (the ground potential) (on a negative electrode terminal side of the control electrode power supply 14).

Figure 2:
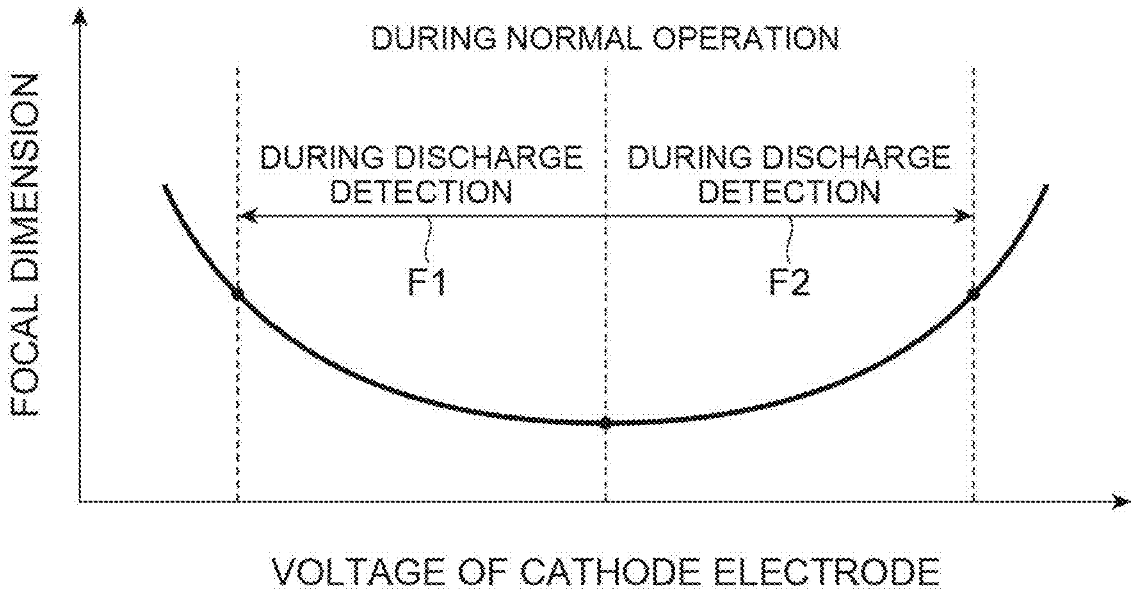
FIG. 2 is a view illustrating operation of a voltage switching unit during normal operation and discharge detection.

When the voltage of the cathode electrode 5 drops during the discharge detection, the voltage difference between the cathode electrode 5 and the control electrode 8 is smaller than that during the normal operation, and the initial velocity of the electrons E emitted from the cathode electrode 5 decreases. As described above, the focal dimension of the electrons E on the target 9 is controlled by the initial velocity of the electrons E and the action of the electrostatic lens. When the initial velocity of the electrons E emitted from the cathode electrode 5 decreases, a focal position of the electrons E on the electron incident surface 9*a* of the target 9 deviates along an orbital axis of the electrons E. Therefore, as illustrated in FIG. 2, the focal dimension of the electrons E on the target 9 is larger than that of the electrons E on the target 9 during the normal operation.

In the present embodiment, since the voltage of the cathode electrode 5 drops as compared with that during the normal operation (see an arrow F1 in FIG. 2) by the current during discharge flowing through the resistor 23, the focal dimension of the electrons E on the target 9 is larger than that of the electrons E on the target 9 during the normal operation by the focal position of the electrons E being shifted forward of the target 9. Therefore, even when the amount of electrons emitted from the cathode electrode 5 cannot be temporarily controlled due to the discharge generated between the cathode electrode 5 and the adjustment electrode 7, it is possible to suppress damage to the target 9 due to incidence of excessive electrons E on the target 9.

As described above, in the X-ray generator 1, when the discharge between the cathode electrode 5 and the adjustment electrode 7 is detected, the focal dimension of the electrons on the target 9 is made larger than that of the electrons E on the target 9 during the normal operation by switching the voltage difference between the cathode electrode 5 and the control electrode 8. Thus, even when excessive electron emission occurs from the cathode electrode 5 due to the discharge between the cathode electrode 5 and the adjustment electrode 7, it is possible to suppress excessive concentration of the electrons E on the target 9 and avoid the damage to the target 9.

In the present embodiment, the voltage switching unit 22 makes the voltage difference between the cathode electrode 5 and the control electrode 8 during the discharge detection smaller than that during the normal operation. Thus, the focal dimension of the electrons E on the target 9 during the discharge detection can be more reliably made larger than that of the electrons E on the target 9 during the normal operation.

In the present embodiment, the voltage switching unit 22 includes a resistor 23 electrically connected to the cathode electrode 5. In this case, when the electrons E at a level at which the target 9 is damaged are emitted from the cathode electrode 5 by the discharge between the cathode electrode 5 and the adjustment electrode 7, a current larger than that during the normal operation flows from the cathode electrode 5 to the resistor 23. Thus, the voltage of the cathode electrode 5 drops, and the focal dimension of the electrons E on the target 9 is larger than that of the electrons E on the target 9 during the normal operation. With this configuration, since the current during discharge flows through the resistor 23, the resistor 23 itself functions as the discharge detection unit 21 and the voltage switching unit 22, and thus a control unit or the like that controls the voltage switching unit 22 is unnecessary, and the damage to the target 9 can be avoided with a simple configuration.

Figure 3:
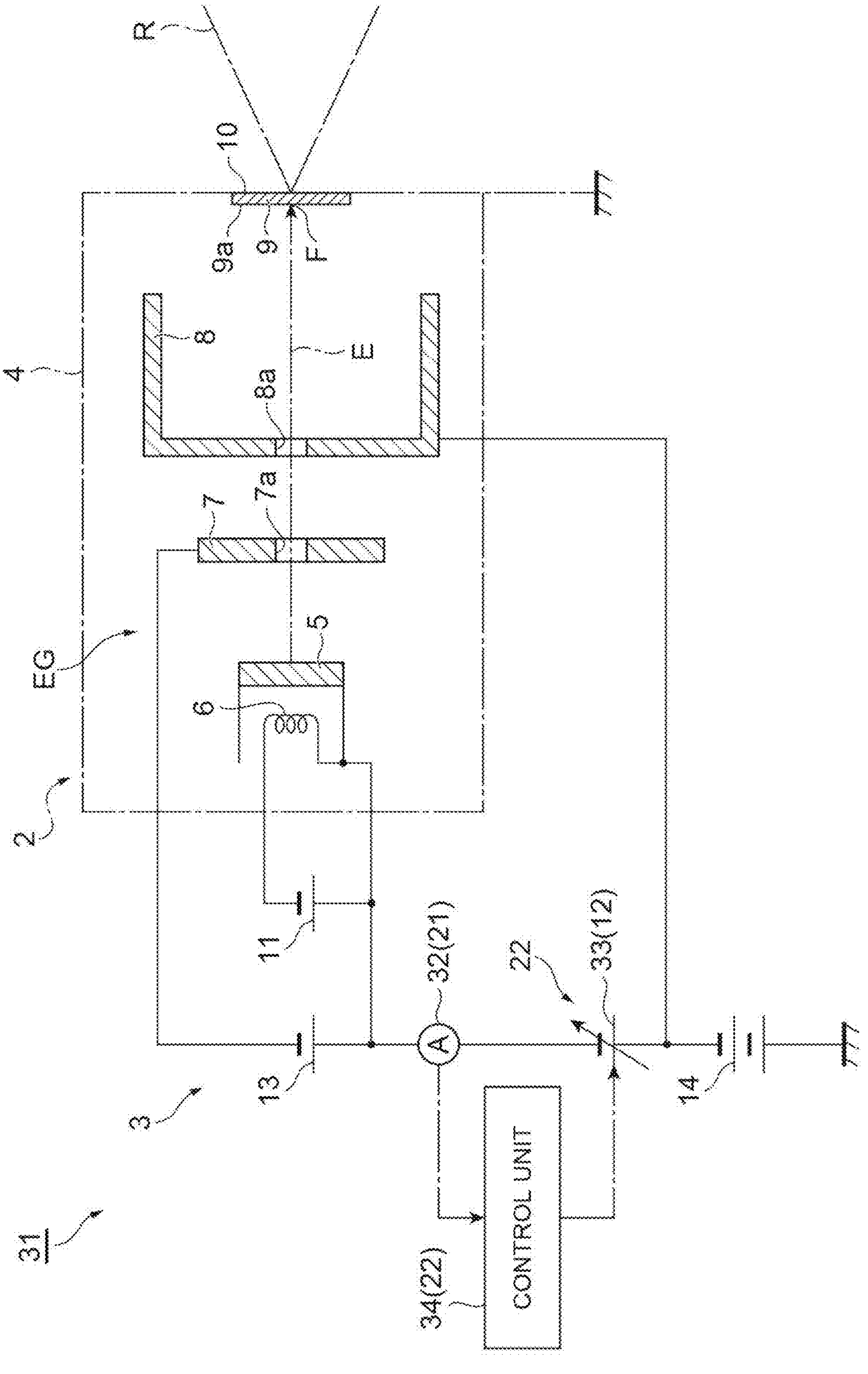
FIG. 3 is a schematic view illustrating a configuration of the X-ray generator according to a modification.

FIG. 3 is a schematic view illustrating a configuration of the X-ray generator according to a modification. As illustrated in the figure, an X-ray generator 31 according to the modification is different from the X-ray generator 1 illustrated in FIG. 1 in configurations of the discharge detection unit 21 and the voltage switching unit 22.

Specifically, in the X-ray generator 31, a current detection unit 32 as the discharge detection unit 21 is provided instead of the resistor 23. The current detection unit 32 includes, for example, a current transformer or a resistor having a smaller electric resistance value than the resistor 23. In addition, as the voltage switching unit 22, the cathode electrode power supply 12 includes a variable power supply 33, and a control unit 34 that controls operation of the variable power supply 33 is provided. The control unit 34 is configured to physically include, for example, a processor such as a CPU and a storage medium such as a RAM and a ROM. The control unit 34 may be a smartphone or a tablet terminal integrally provided with a display unit and an input unit, and may include a microcomputer, a field-programmable gate array (FPGA), or the like.

In the X-ray generator 31, when the current detection unit 32 detects the current during discharge from the cathode electrode 5, a signal indicating a detection result is output to the control unit 34. The control unit 34 that has received the signal from the current detection unit 32 controls the variable power supply 33 to switch the voltage difference between the cathode electrode 5 and the control electrode 8 so that the focal dimension of the electrons E on the target 9 is larger than that of the electrons E on the target 9 during the normal operation. Thus, even when excessive electron emission occurs from the cathode electrode 5 due to the discharge between the cathode electrode 5 and the adjustment electrode 7, it is possible to suppress excessive concentration of the electrons E on the target 9 and avoid the damage to the target 9.

Further, in the present embodiment, the voltage switching unit 22 includes the variable power supply 33. Thus, the focal dimension of the electrons E can be freely adjusted by controlling a variation amount of the voltage of the cathode electrode 5, and the damage to the target 9 can be more reliably avoided.

Note that, as in the X-ray generator 1 illustrated in FIG. 1, when the discharge detection unit 21 and the voltage switching unit 22 are constituted by the resistor 23, the voltage of the cathode electrode 5 drops as compared with the voltage during the normal operation by the current during discharge flowing through the resistor 23, however, in the present embodiment, when the current detection unit 32 detects the current during discharge, the voltage of the cathode electrode 5 may be lowered as compared with the voltage during the normal operation by the variable power supply 33 (see the arrow F1 in FIG. 2), or may be increased as compared with the voltage during the normal operation (see an arrow F2 in FIG. 2).

When the voltage of the cathode electrode 5 is increased as compared with that in the normal operation, since the focal position of the electrons E is shifted rearward of the target 9, the focal dimension of the electron E on the target 9 is larger than that of the electrons E on the target 9 during the normal operation. Therefore, the damage to the target 9 due to excessive concentration of the electrons E on the target 9 can be suppressed as in a case where the voltage of the cathode electrode 5 is lowered as compared with that in the normal operation.

The present disclosure is not limited to the above embodiment. For example, in the above embodiment, the transmission type X-ray tube is exemplified as the X-ray tube 2, but the X-ray tube 2 may be a reflection type X-ray tube. Further, in the above embodiment, a sealed tube structure in which the vacuum housing 4 is sealed as a vacuum tube is exemplified as the X-ray tube 2, but the X-ray tube 2 may have an open tube structure including an exhaust pump or the like. Further, in the above embodiment, a hot cathode structure including the heater 6 is exemplified as the electron gun EG, but the electron gun EG may have a cold cathode structure. A potential relationship applied to the electron gun EG and the target 9 may be any relationship in which the electrons E are directed toward the target at the time of X-ray generation, and an electrode other than the target 9 may be the reference potential (ground potential).

A position of the discharge detection unit 21 is not limited to between the cathode electrode 5 and the cathode electrode power supply 12, and may be provided, for example, between the adjustment electrode 7 and a negative electrode terminal of the adjustment electrode power supply 13. In this case, the discharge detection unit 21 detects a current flowing from the adjustment electrode 7 to the negative electrode terminal of the adjustment electrode power supply 13 (a current flowing through the adjustment electrode 7) as the current during discharge. The discharge detection unit 21 may be provided between a positive electrode terminal of the adjustment electrode power supply 13 and the cathode electrode 5. In this case, the discharge detection unit 21 detects a current flowing from the positive electrode terminal of the adjustment electrode power supply 13 to the cathode electrode 5 as the current during discharge. The discharge detection unit 21 may be provided between the target 9 and the ground potential. In this case, the discharge detection unit 21 detects a current flowing through the target 9 as the current during discharge.

What is claimed is:

1. An X-ray generator comprising:
- a cathode electrode configured to emit electrons;
- an adjustment electrode configured to adjust an amount of electrons emitted from the cathode electrode;
- a control electrode configured to control a trajectory of the electrons from the cathode electrode;
- a target configured to generate an X-ray by incidence of the electrons;
- a discharge detection unit configured to detect discharge between the cathode electrode and the adjustment electrode; and
- a voltage switching unit configured to switch a voltage difference between the cathode electrode and the control electrode such that a focal dimension of the electrons on the target during discharge detection is larger than the focal dimension of the electrons on the target during normal operation.

2. The X-ray generator according to claim 1, wherein the voltage switching unit makes the voltage difference between the cathode electrode and the control electrode during the discharge detection smaller than the voltage difference during the normal operation.

3. The X-ray generator according to claim 2, wherein the voltage switching unit includes a resistor electrically connected to the cathode electrode.

4. The X-ray generator according to claim 2, wherein the voltage switching unit includes a variable power supply for applying a voltage to the cathode electrode.

5. The X-ray generator according to claim 1, wherein the voltage switching unit includes a variable power supply for applying a voltage to the cathode electrode.

6. An X-ray generator comprising:

a cathode electrode configured to emit electrons;

an adjustment electrode configured to adjust an amount of electrons emitted from the cathode electrode;

a control electrode configured to control a trajectory of the electrons from the cathode electrode;

a target configured to generate an X-ray by incidence of the electrons;

a discharge detection unit configured to detect discharge between the cathode electrode and the adjustment electrode; and a voltage switching unit configured to switch a voltage difference between the cathode electrode and the control electrode such that a focal dimension of the electrons on the target during discharge detection is larger than the focal dimension of the electrons on the target during normal operation, wherein the voltage switching unit includes a resistor electrically connected to the cathode electrode.

* * * * *